United States Patent [19]
Hirs

[11] 3,900,395
[45] Aug. 19, 1975

[54] METHOD OF AND APPARATUS FOR FILTERING

[75] Inventor: Gene Hirs, Birmingham, Mich.

[73] Assignee: Hydromation Filter Company, Livonia, Mich.

[22] Filed: Aug. 16, 1973

[21] Appl. No.: 389,061

[52] U.S. Cl. .................... 210/80; 210/82; 210/290; 210/503
[51] Int. Cl.[2] .......................................... B01D 23/10
[58] Field of Search ............ 210/39, 40, 67, 75, 80, 210/82, 275, 290, 500, 503

[56] References Cited
UNITED STATES PATENTS

| | | | |
|---|---|---|---|
| 3,436,260 | 4/1969 | Duff | 210/290 X |
| 3,557,961 | 1/1971 | Stuart | 210/290 X |
| 3,680,699 | 8/1972 | MacPherson | 210/75 |
| 3,719,473 | 3/1973 | Waiss, Jr. et al. | 210/39 X |
| 3,780,861 | 12/1973 | Hirs | 210/80 |

Primary Examiner—Frank A. Spear, Jr.
Assistant Examiner—Robert G. Mukai
Attorney, Agent, or Firm—Cullen, Settle, Sloman & Cantor

[57] ABSTRACT

A method of and apparatus for more efficiently filtering particulate contaminants by providing a filter bed composed of a layer of anthracite coal filtering media covered by a layer of granulated shells of black walnuts. The granulated shells serve to open up the surface of the filtering media to enable more effective penetration thereof by particulate contaminants.

3 Claims, 1 Drawing Figure

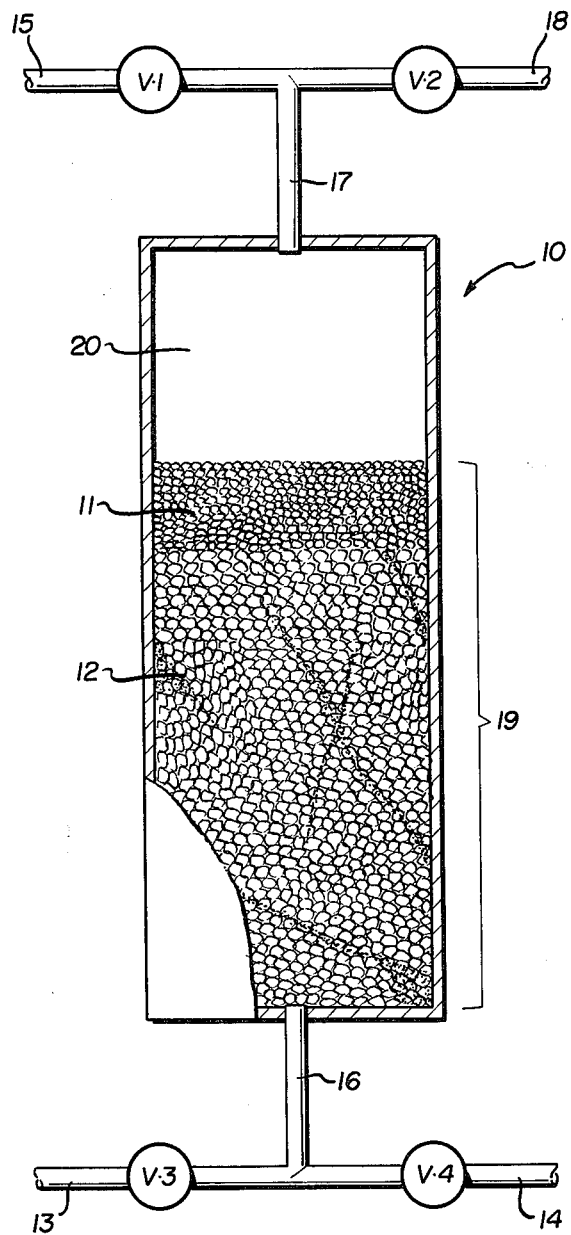

METHOD OF AND APPARATUS FOR FILTERING

BACKGROUND OF THE INVENTION

Over 50 years ago, anthracite coal began being used as a filter media to replace some of the less efficient and earlier used filter media, such as silica and quartz. Because of the advantages anthracite has over some of the older types of filter media, for example, longer runs, higher rates, and lower wash water consumption, it has become a standard and well known media for use in filtering devices, especially of the deep bed filter type.

Anthracite coal particularly suited for use as a filter media is sold under various trade names one of which is Anthrafilt. The preferred anthracite is low in ash, high in anthraxylon, and having low friability. This last feature is of critical importance due to the necessity in maintaining a particular filter granule size for a desired filtering effect. Other particular qualities and characteristics of anthracite, including the various trade name products, are well known to those skilled in the art.

However, even with all its advantages, there are certain characteristics of anthracite which limit its effectiveness as a granular deep bed filter media. Applicant has found that even carefully selected and graded anthracite contains a certain amount of coal fines, smaller or finer coal granules, which tend to accumulate at the upper surface of a filter bed after repeated filtration and backwash cycles, and which remain in the filter bed even after utilizing special backwash procedures for removing some of the extra fine material. Further, additional fines accumulate over a period of time as a result of the fracturing of individual anthracite coal granules during the backwash cycles.

The gradation of smaller or finer granules toward the upper surface of granular filter beds is a well known phenomenon occurring in all granular deep bed type filters having a filter media of uniform specific gravity. However, anthracite coal fines differ from the fines of other filter media materials, such as sand and garnet which are spherical or three-dimensionally shaped, in that they are primarily flaky and two-dimensional in shape. This flaky, two-dimensional configuration causes the fines to tend to lay flat on the upper surface of the filter media bed and inhibit effective penetration of dirt particles into the filter. This causes the dirt particles to accumulate on the upper surface of the filter bed resulting in a surface loading condition and therefore very short filtration cycles.

In general, many combinations of filter materials having differing sizes and specific gravities have been employed in an attempt to overcome the poor filtration characteristics which result from fines accumulating at the upper surface of the filter media. One of the most common of these uses larger granule anthracite in combination with sand, wherein the anthracite having the lesser specific gravity tends to "float" in the upper part of the filter bed above the sand. Such an arrangement is disclosed in Hirsch, U.S. Pat. No. 3,497,068, Feb. 24, 1970. Even more elaborate multimedia deep bed filters are disclosed in Rice, U.S. Pat. No. 3,343,680, Sept. 26, 1967, wherein various combinations of garnet, graphitic rock, anthracite coal, silica sand, magnetite, ilimenite, nylon, polyethylene, and alumina are intermixed to achieve progressive, staged filtering. It has been further suggested, and put into practice in at least one instance, that placing large lightweight plastics on top of coal might be a feasible combination to achieve suitable filtration characteristics in a granular deep bed filter.

BRIEF SUMMARY

Accordingly, it is an object of this invention to eliminate the inherent drawbacks and disadvantages which accompany the use of anthracite coal in a deep bed filter. To accomplish this, the surface barrier created by the two dimensional fines must be eliminated so that particulate contaminants can travel into and be trapped by the primary layer of larger anthracite granules.

Further ancillary objects which are to be accomplished by the present invention include longer filter runs, higher filtration rates, and lower wash water consumption, which in turn eliminate higher costs and longer non-operational time.

The present invention accomplishes these objects by using granular black walnut shells in combination with anthracite coal as a deep bed filter method and apparatus. The granules of black walnut shells are larger than the fines of anthracite coal in the filter, and having a specific gravity of approximately 1.4 (as compared with a specific gravity of from 1.5 to 1.7 for anthracite), intermixed with the anthracite coal fines after initial backwashing of the filter bed.

The presence of the three-dimensionally angular and larger sized granular walnut shells on the surface of the flaky anthracite coal fines, or even in admixture therewith, opens the surface of the anthracite coal bed for more effective penetration by dirt particles, resulting in less surface loading and longer filtration cycles. This particular mixture of granular walnut shells with anthracite coal results in a synergistic effect, with the combination producing more effective filtration than either walnut shells or anthracite coal alone. In addition, the intermixed granular walnut shells break up the flat, impervious surface of the fine, flaky particles of anthracite so that they can also be effective in the filtering process. Without the intermixed walnut shells, the anthracite fines tend to lay flat much as the slats of a venetian blind. The walnut shells open these blinding fines to take full advantage of filtration surface phenomenon, which predominates in most deep bed filtration.

Black walnut shells have certain inherent features which make them a particularly adaptable and unique material for use in a filter bed in combination with anthracite coal. First, the material is a low-cost waste by-product, as are some of the anthracite coals used in the filtering field. Further, the material has an ideal specific gravity for use with anthracite coal since it will tend to "float" or stay on top of the larger anthracite granules and not intermix therewith. Further, it fractures into an ideal three dimensional angular shape for effective intermixing with the anthracite coal fines and is readily wettable in an aqueous solution. Walnut shells therefore have a definite advantage over plastic granules, since the latter are costly and hydrophobic. Furthermore, plastic has a natural static electricity characteristic which attracts small air bubbles that cause the plastic material to disengage the anthracite filter media and thereby discontinue to open up the media surface for effective particulate contaminant penetration.

BRIEF DESCRIPTION OF THE DRAWING

The single drawing is a vertical sectional view through the filtering vessel and its associated filter bed, inlet and outlet fluid conduits, and valving system.

DETAILED DESCRIPTION

In the drawing, reference numeral 10 refers to the filter vessel which houses the multimedia filtering arrangement 19 forming the present invention. Upper part 11 of the filter bed is comprised primarily of granulated black walnut shells having a specific gravity of approximately 1.4 and a size greater than that of the fines of anthracite coal. Additionally, intermixed with the walnut shells are fines of anthracite coal, which, but for the presence of the shells, would accumulate at the top of the lower portion of the filter bed. Reference numeral 12 refers to the lower part of the filter bed, which is comprised primarily of anthracite coal in combination with relatively few, if any, granules of black walnuts. In the preferred embodiment the filter media bed 19 is formed by a lower bed of anthracite coal having a depth of 42 inches and an upper bed of black walnut shells having a depth of 6 inches.

In forming the complete filter bed, the lower material of anthracite is placed within the filter vessel first, backwashed to remove most of the very fine material, and allowed to settle back in place before the shells are layered thereover. These two layers, preferably, then are intermixed at the interface by backwashing.

Other standard features of the illustrated deep bed filtering system include inlet and outlet conduits 13, 14, 15, 16, 17 and 18 and regulator valves V1, V2, V3, and V4.

In operation, contaminated liquid enters through conduit 15, open valve V1 and into filter vessel 10 through conduit 17. The contaminated liquid passes through the multimedia granular filter bed 19 and out through conduit 16, open valve V3, and conduit 13. During the filtration cycle backwash valves V2 and V4 are closed.

After a period of use, filter media bed 19 becomes loaded with entrapped particulate contaminants and must be backwashed. This is accomplished by closing valves V1 and V3, opening valves V4 and V2 and flowing backwash water into and through the filter vessel through conduits 14 and 16. The filter bed 19 will expand into space 20 and will release entrapped contaminants which will flow with the backwash water out through conduits 17 and 18. After the backwash cycle has been completed, valves V2 and V4 are closed, filter media bed 19 settles to the position shown in the drawing, valves V1 and V3 are opened, and the filtration cycle resumes.

EXAMPLES

The following examples demonstrate the effectiveness of the filter media bed of the present invention. For purposes of these examples No. 1 and No. 1½ anthracite referred to were commercially available Anthrafilt with the following sieve analysis:

ANTHRACITE

| U.S. Standard Mesh Size | No.1 (% by weight) | No. 1 1/2 (% by weight) |
|---|---|---|
| Retained on No. 8 | -0- | 5.5 |
| Retained on No. 16 | 37.2 | 62.5 |
| Retained on No. 20 | 44.3 | 24.0 |
| Retained on No. 30 | 13.7 | 5.5 |
| passing 30 | 4.8 | 2.5 |

The granular walnut shell designations referred to have the following sieve analysis:

GRANULAR WALNUT SHELLS

| U.S. Standard Mesh Size | No. 20/30 (% by weight) | No. 12/20 (% by weight) |
|---|---|---|
| Retained on No. 14 | -0- | 2.0 |
| Retained on No. 16 | -0- | 29.5 |
| Retained on No. 20 | 14.4 | 66.5 |
| Retained on No. 30 | 73.5 | 2.0 |
| passing 30 | 12.1 | -0- |
| Retained on 40 | 10.6 | |
| passing 40 | 1.5 | |

In each example the dirt loading comprised of 100 ppm particulate contaminants consisting of Georgia Kaolin hydrite of which the medium particle size was 0.55 microns. Polyelectrolyte filter aid (Nalco 8861) was added at the rate of 0.5 ppm. In all cases the total depth of the filter media bed was forty eight inches. All of the tests were run at a flow rate of 10 gpm per square foot of surface inlet area and at substantially the same temperature to eliminate liquid viscosity as a material factor. Each test was terminated when a 6 foot pressure differential was reached across the filter bed or when the rate of dirt removal dropped below 80 percent, whichever first occurred.

EXAMPLE 1 (a)

In this example the test was run with 48 inches of No. 1 anthracite. The terminal pressure differential across the filter bed of 6 feet was reached after 285 gallons of liquid were filtered per square foot of inlet surface area. Composite effluent clarity was excellent, being less than 5 Jackson Turbidity Units (JTU). On observation it was apparent that a surface loading condition predominated and caused the terminal pressure differential to be reached in a relatively short time.

EXAMPLE 1 (b)

The filter bed for this test run was comprised of 42 inches of No. 1 anthracite topped with 6 inches of No. 20/30 granular black walnut shells. Terminal pressure differential was reached after 1,840 gallons of contaminated liquid were filtered per square foiot of inlet surface area. The composite effluent clarity was below 5 JTU. This filter was more than 6 times as effective as the filter in Example 1 (a), the primary difference in effectiveness being attributed to the presence of granular walnut shells to open up the surface of the anthracite filtering media.

EXAMPLE 1 (c)

In this test run 42 inches of No. 1 anthracite coal was again used, but was topped by 6 inches of No. 12/20 granular black walnut shells. In this particular test 2,300 gallons were filtered per square foot of inlet surface area before the run was terminated on the basis of deterioration of effluent quality, rather than terminal pressure differential. The composite effluent clarity was less than 25 JTU. In this example visual observation showed that the walnut shells intermixed with the anthracite fines and also with some of the larger granules of anthracite at lower levels of the filter media bed. This greater depth of intermixing produced a more predominant synergistic effect resulting in overall improved filter efficiency.

EXAMPLE 2 (a)

In this test, 48 inches of No. 1½ anthracite were used without the aid of walnut shells. The run was terminated as a result of effluent clarity deterioration after 2,100 gallons of contaminated liquid were filtered per square foot of inlet surface area. The composite effluent clarity was approximately 21 JTU. The larger granule size of No. 1½ anthracite and the lesser amount of fines resulted in a much longer run than that experienced in Example 1 (a).

EXAMPLE 2 (b)

In this final test, 42 inches of No. 1½ anthracite were used in conjunction with 6 inches of No. 12/20 granular black walnut shells. The test was terminated on the basis of effluent deterioration after 4,700 gallons of contaminated liquid were filtered per square foot inlet surface area. Here again the dramatic effectiveness of using granular black walnut shells in combination with anthracite coal is well demonstrated.

The particular description of anthracite coal as the primary filtering constituent is merely for exemplary purposes only. Any filter medium, which has a specific gravity greater than that of black walnut shells and also has flaky fines tending to block the filter medium inlet surface, is particularly adaptable for use in the present invention.

I claim:

1. In a filtering apparatus for removing particulate contaminants from liquids, said apparatus having:
   an anthracite coal filter media bed characterized by primary filter granules and smaller, fine, relatively flat, flaky particles, said bed having upper inlet and lower outlet surfaces and said smaller fine particles tending to accumulate in the region of the inlet surface after backwashing to thereby inhibit penetration into said anthracite media bed by particulate contaminants,
   the improvement of a layer of granulated black walnut shells positioned on the inlet surface of said anthracite media bed, said black walnut shells being selected to have a size and shape in relation to the fine anthracite particles for intermixing therewith after backwashing and having an angular, three-dimensional configuration to inhibit blinding off of said bed of anthracite coal by said fine particles and accumulated contaminants, a portion of said black walnut shells being intermixed in the inlet surface of the filter media bed with at least a portion of the smaller fine particles,
   said layer of granulated walnut shells improving the filter capabilities of said bed by enabling more effective penetration of said inlet surface by said particulate contaminants.

2. In a method of improving the filter capabilities of an anthracite coal filter bed used in removing particulate contaminants from liquid, said bed having upper inlet and lower outlet surfaces and characterized by primary filter granules and smaller, fine, relatively flat, flaky particles, the steps of:
   forming said bed with at least a portion of the smaller fine, relatively flat, flaky particles near the inlet surface of the filter bed, and
   interspersing granulated black walnut shells having an angular, three-dimensional configuration with at least a portion of said smaller fine particles thereby orienting at least a portion of said smaller, fine, relatively flat, flaky particles in an inclined position relative to the horizontal to inhibit blinding off of said bed, said shells being selected to have a shape and size to become interspersed with said smaller fine particles subsequent to backwashing of the filter for improving the filter capabilities of said bed by enabling more effective penetration of said inlet surface by said particulate contaminants.

3. In a method of filtering liquid cointaining particulate contaminants, the steps of:
   flowing said contaminated liquid through a filter media bed comprising a layer of granulated black walnut shells interspersed with fine, flaky coal particles and superimposed upon a layer of granular anthracite coal filter media, said granulated black walnut shells having an angular, three-dimensional configuration and being selected to become interspersed with the fine flaky coal particles subsequent to backwashing, at least a portion of said fine, flaky coal particles being inclined relative to the horizontal due to intermixing with said walnut shells;
   removing at least a portion of the particulate contaminants from said liquid during said flow;
   terminating said flow after said filter media bed has become at least partially clogged by entrapment of said particulate contaminants;
   backwashing liquid through said filter media bed in a direction reverse to that of filtration flow;
   terminating said backwashing after at least part of said entrapped particulate contaminants have been removed from said filter media bed and thereby accomplishing the improvement of: the improvement of:
   1 forming said layer of granular anthracite coal filter media,
   2 intermixing at least a portion of said granulated black walnut shells with at least a portion of said fine, flaky coal particles, and
   3 superimposing said intermixture of granulated black walnut shells and fine, flaky coal particles on said layer of granular anthracite coal filter media,
   so that during filtration flow of said contaminated liquid, said fine coal particles are prevented from accumulating and laying flat on the inlet surface of said layer of granular anthracite coal filter media and hampering passage by said particulate contaminants.

\* \* \* \* \*